United States Patent [19]

Haasl et al.

[11] Patent Number: 4,745,139

[45] Date of Patent: May 17, 1988

[54] ELASTOMERIC COATINGS CONTAINING GLASS BUBBLES

[75] Inventors: Robert J. Haasl, Roseville; Thomas M. Miller, Lakeland; Scott R. Haasl, Roseville, all of Minn.

[73] Assignee: PDI, Inc., St. Paul, Minn.

[21] Appl. No.: 12,339

[22] Filed: Feb. 9, 1987

[51] Int. Cl.⁴ .............................. C08J 5/14; C08J 9/32; C08L 53/00

[52] U.S. Cl. .................................... 523/149; 523/150; 523/171; 523/219; 524/505

[58] Field of Search ............... 523/149, 150, 171, 219; 524/505

[56] References Cited

U.S. PATENT DOCUMENTS

| | | |
|---|---|---|
| 3,036,928 | 5/1962 | Poole .................................. 523/219 |
| 3,230,184 | 1/1966 | Alford . |
| 3,365,315 | 1/1968 | Beck et al. . |
| 3,642,675 | 2/1972 | McKenzie . |
| 3,660,849 | 5/1972 | Jonnes et al. . |
| 3,827,978 | 8/1974 | Miles . |
| 3,866,373 | 2/1975 | Hudock . |
| 3,873,475 | 3/1975 | Pechacek et al. . |
| 3,904,560 | 9/1975 | McKenzie . |
| 3,986,213 | 10/1976 | Lynch . |
| 4,053,448 | 10/1977 | Holle . |
| 4,391,646 | 7/1983 | Howell . |
| 4,528,231 | 7/1985 | Lund .................................. 523/150 |

FOREIGN PATENT DOCUMENTS

| | | | |
|---|---|---|---|
| 0183781 | 10/1983 | Japan .................................. | 523/149 |
| 0988790 | 1/1983 | U.S.S.R. ............................. | 523/219 |

Primary Examiner—Herbert J. Lilling
Attorney, Agent, or Firm—Orrin M. Haugen; Thomas J. Nikolai; Frederick W. Niebuhr

[57] ABSTRACT

A formulation for surface coating applications, particularly surfaces which are in frequent contact with water and remain water-wet, and/or surfaces of elastomeric and plastic foams, especially foams fabricated from polyethylene and polyurethane resins. The formulation includes a vehicle consisting primarily of a block polymer of styrene/ethylene/butylene/styrene and methylmethacrylate copolymer or related block polymer with lesser degrees of ethylenic unsaturation together with a rubber tackifier, with fillers being provided including particulate colloidal or powdered silicon dioxide, and glass microspheres having an average size of less than about 70 microns. The formulation is such that it is adaptable to be applied by either air pressure spray systems or aerosol packaging techniques.

3 Claims, No Drawings

ELASTOMERIC COATINGS CONTAINING GLASS BUBBLES

BACKGROUND OF THE INVENTION

The present invention relates generally to an improved formulation for surface coating applications, particularly wherein the surfaces to be coated are in frequent contact with water, and additional surface roughness is required to increase frictional and anti-slip characteristics of the surface. The surface coating formulations of the present invention are particularly adapted for providing uniform surface roughness or coarseness which enhances frictional, and particularly anti-slip characteristics on treated surfaces.

In many situations, it is desirable, if not necessary, to provide a surface with enhanced frictional properties, particularly a surface which is roughened sufficiently to provide the desired frictional and anti-slip characteristics. One typical application is for decks of surfboards, as well as on surfaces of wind surfing equipment. The recent increase in popularity of these items as sporting equipment has created an unusual need for an anti-slip coating which is effective under water-wet conditions, including a relatively wide range of temperatures. In addition to use in combination with sporting equipment, this material may also be used around swimming pools, shower stalls, bathtubs, and other areas where it is desirable to have anti-slip characteristics in surfaces subject to becoming wet with water.

Various types of anti-slip products have been designed in the past, and frequently in the form of a laminate or thin flexible decal which may be applied to a surface by pressure-sensitive adhesive or the like. The present formulation, being an organic solvent coating dispersion, may be applied by either brushing, spraying, or other conventional techniques to the entire area desired for the coating. The formulation, because of the selection of components, is such that spraying may be achieved by air-pressure systems, or alternatively by aerosol packaging.

One unusual feature of this invention is the high degree of anti-slip characteristics and properties which are developed in the exposed surface, particularly under water-wet conditions. While the specific reason for achieving this increase in friction and anti-slip properties is unknown, it is believed to have been achieved by the combination of an elastomeric vehicle with high-strength glass bubbles or spheres. High-strength glass bubbles of generally spherical form are described in U.S. Pat. No. 3,365,315, and are, of course, commercially available. The vehicle, including the elastomeric components, provides good adhesion to the surface to which it is being applied, as well as a proper balance and maintenance of cohesive properties. Specifically, the formulations of the present invention provide an appropriate adjustment of adhesive strength to cohesive strength in the finished cured coating. Thus, the formulations of the present invention have been found to be resistant to stripping or peeling, and have been found to achieve the property of removal from the surface only upon tearing.

In connection with surfboard enthusiasts, there are demands for various types of anti-slip coating formulations. In certain applications, and for certain such enthusiasts, it is deemed desirable to have a transparent coating which makes it possible to exhibit any unusual feature of the natural surface or any unique or colorful design of the artwork available on the surfboard substrate. In others, there may be a need or desire for applying a certain type of coating as well as coatings which fluoresce or otherwise glow in the presence of ultraviolet rays of the sun. With each of these various features in mind, the coating formulations of the present invention lend themselves to modification so as to achieve such results and/or properties, while still permitting application by spraying, including both air-pressure and aerosol spraying. The components present in the formulations of the present invention are non-clogging, this being due to the utilization of the glass bubbles which are small in size and substantially spherical in configuration.

In addition to use of these coatings on surfaces which are frequently subject to wetting, the materials have application for use on surfaces of elastomeric and plastic foams, especially polyethylene and polyurethane foams. In particular, closed foams are used for a variety of purposes and as such, do not permit air to pass readily from one side to the other. In connection with certain facilities used for athletic purposes, such as exercise and wrestling mats, these materials have a frequent need of covering or coating with an elastomeric seal-coat with anti-slip properties. It is a desirable feature of any such seal-coat to utilize a coating which bridges the surface pores of the foam without providing significant penetration of the pore structure of the foam. In this fashion, saturation of the pores of the foam with the seal-coat is avoided. Such a feature is desirable in that saturation would in certain instances detract from the padding effect and would further increase the weight of the foam structure, thus providing for added weight, less resiliency or bounce, and less absorption of impact.

SUMMARY OF THE INVENTION

Therefore, it is a primary object of the present invention to provide an improved coating formulation which has increased frictional and anti-slip properties, and which formulation is capable of being applied to surfaces by conventional spray techniques, including air pressure and/or aerosol techniques.

It is a further object of the present invention to provide an improved formulation for coating surfaces which are normally in contact with water, and wherein the improved frictional and anti-slip characteristics are retained when used on surfaces which are normally water-wet during use.

It is yet a further object of the present invention to provide an improved coating formulation for water-wet surfaces which includes a quantity of high-strength glass bubbles or microspheres in the formulation, and which formulation is capable of surface application by spraying with either air pressure or aerosol packaging techniques.

Other and further objects of the present invention will become apparent to those skilled in the art upon a study of the following specification and appended claims.

DESCRIPTION OF THE PREFERRED EMBODIMENT

The preferred embodiments of the present invention are best expressed in terms of the following examples hereinbelow.

EXAMPLE 1

A translucent anti-slip coating composition as follows:

| Material | Parts by Weight |
| --- | --- |
| Solvent mixture[1] | 52.19 |
| Powdered colloidal Silicon dioxide[2] (Cabosil M-5) | 0.849 |
| Powdered colloidal Silicon dioxide[2] (Cabosil N 70TS) | 0.66 |
| An elastomeric styrene/ethylene/butylene/styrene block copolymer (Kraton G 1652)[3] | 9.97 |
| A rubber tackifier (Piccotac B-BHT) | 5.35 |
| Tinuvin - P[5] | 0.0179 |
| Irganox–1010[6] | .0.0179 |
| Glass bubbles (B23/500)[7] | 1.707 |
| 1,1,1 Trichloroethane | 20.36 |
| Acryloid B-48-S[8] | 8.88 |

The formulations as set forth above are available commercially as set forth hereinbelow.

(1) The solvent mixture includes 1,1,1 Trichloroethane, VMP Naptha, and methylene chloride in the ratio of 50/19/7 by weight.

(2) The silicon dioxide fillers, a particulate colloidal or powdered silicon dioxide, sold under the code name "Cabosil M-5" and "Cabosil N 70-TS", are supplied by the Cabot Corp. of Tuscola, Ill.

(3) A styrene/ethylene/butylene/styrene block copolymer sold under the code name "Kraton G 1652", supplied by Shell Chemical Co.

(4) Piccotac B-BHT is a rubber tackifier sold by Pennsylvania Industrial Chemical Corp. of Chairton, Pa.

(5) Tinuvin-P is an ultraviolet stabilizer sold by the Geigy Chemical Corp. of Yonkers, N.Y.

(6) Irganox-1010 is an antioxidant sold by the Geigy Chemical Corp. of Yonkers, N.Y.

(7) Glass bubbles (B23/500) are part of a unique series of microspheres, with an average size of less than 70 microns, sold by the 3M Company, St. Paul, Minn.

(8) A solvent solution of methylmethacrylate copolymer in 45% solution in 54:1 ratio of toluene and 2-methoxyethanol sold under the code name "Acryloid B-48-S", sold by the Rohm & Haas Company.

EXAMPLE 2

A fluorescent pigmented anti-slip coating composition, as follows:

| Material | Parts by Weight |
| --- | --- |
| Solvent mixture[1] | 52.48 |
| Powdered colloidal Silicon dioxide[2] (Cabosil M-5) | 0.066 |
| Powdered colloidal Silicon dioxide[2] (Cabosil N 70TS) | 0.67 |
| A styrene/ethylene/butylene/styrene block copolymer (Kraton G 1652 (Shell))[3] | 7.78 |
| A rubber tackifier (Piccotac B-BHT)[4] | 4.16 |
| Tinuvin - P[5] | 0.014 |
| Irganox-1010[6] | .0.014 |
| Glass bubbles (B23/500)[7] | 2.655 |
| Acryloid B-48-S[8] | 8.99 |
| 1,1,1 Trichloroethane | 20.23 |
| Fluorescent Pink Pigment[9] | 2.25 |

The pigmentation is available commercially as follows:

(9) Fluorescent Aurora Pink A-11, sold by Day-Glo Color Corp., Cleveland, Ohio. (Solid solution of fluorescent dyes in melamine-sulfonamide formaldehyde resin.)

EXAMPLE 3

A yellow colored anti-slip coating composition, as follows:

| Material | Parts by Weight |
| --- | --- |
| Solvent mixture[1] | 77.31 |
| Powdered colloidal Silicon dioxide[2] (Cabosil M-5) | 0.954 |
| A styrene/ethylene/butylene/styrene block copolymer (Kraton G 1652)[3] | 11.08 |
| A rubber tackifier (Piccotac B-BHT)[4] | 6.01 |
| Tinuvin - P[5] | 0.02 |
| Irganox-1010[6] | .0.02 |
| Glass bubbles (B23/500)[7] | 3.84 |
| L/F Light yellow (824-000-2511)[10] | 0.383 |
| Titanium dioxide-Rutele (823-000-0082)[10] | 0.383 |

(10) GPD (General Purpose Dispersions) sold by Nuodex Inc. of Lockland, Ohio.

The surfaces treated with the formulations set forth in Examples 1-3 hereinabove provide dried coatings having unusual and effective anti-slip and/or gripping action. Water-wet surfaces achieve and retain their characteristic, and as such, are extremely desirable for use on water-wet surfaces, including surfaces of surfboards and wind surfing boards which are used in a variety of diverse conditions.

While the above examples provide specific components within specific quantities, the following table is given for purposes of providing ranges of the significant components.

TABLE 1

| Material In Dried Coating | Parts by Weight |
| --- | --- |
| The elastomeric styrene/ethylene/butylene/styrene block copolymer | 30–60 |
| Silicon dioxide (Cabosil M-5) | 3–10 |
| Glass bubbles (B23/500) | 5–15 |
| Rubber tackifier | 5–15 |
| Methylmethacrylate | 15–25 |

The elastomeric styrene/ethylene/butylene/styrene block copolymer component is, as previously indicated, commercially available. These materials are prepared by copolymerizing styrene with either butadiene or with isoprene to yield an ABA block copolymer. The specific elastomeric block copolymer listed in Examples 1-3 is obtained by reducing with hydrogen to eliminate most of the ethylenic unsaturation which occurs in the butadiene blocks. Thusly treated, the material has been found to be more resistant to the effects of exposure to oxygen as well as ultraviolet radiation. On the other hand, these block copolymers which have not been treated to eliminate most of the ethylenic unsaturation may still be employed, the difference being that somewhat higher levels of stabilizers may be required.

EXAMPLE 4

A seal-coat containing glass bubbles for use in spray application on foams, as follows:

| Material | Parts by Weight |
|---|---|
| Solvent mixture(1) | 56.38 |
| Silicon dioxide(2) (Cabosil M-5) | 0.88 |
| A styrene/ethylene/butylene/styrene block copolymer (Kraton G 1652 (Shell))(3) | 10.64 |
| A rubber tackifier (Piccotac B-BHT) | 3.85 |
| Tinuvin - P(5) | 0.018 |
| Irganox-1010(6) | .0.018 |
| Methylethyl ketone | 8.49 |
| 1,1,1 Trichloroethane | 17.42 |
| Glass bubbles (B23/500)(7) | 2.29 |

Each of the coating formulations set forth hereinabove provide a combination of coating flexibility, surface roughness, along with good adhesion to the surface to which the coatings are applied. For example, surfboards and wind surfing equipment employ fiberglass reinforced styrene-polyester resins and the like. The formulations of the present invention have been shown to be non-moisture sensitive, and stable upon extended exposure to ultraviolet light and/or intense sunlight. Thus, the coatings of the present invention may be utilized under adverse and hostile weather conditions and/or environmental-ambient conditions. Certain of them have application to foam structures as well.

The ingredients which are dissolved in the solvent blend provide a desirable film forming system which is stable in the presence of the environments in which the product is used. Insoluble fillers, including the silicon dioxide and glass bubbles are dispersed in the viscous solution, and provide physical stability for the cured films.

In certain instances, it is desirable to provide a film which is generally transparent, and thus with only limited opacity. This property is particularly desired by certain end users who wish to preserve the colorful designs which may appear on the surface being quoted, such as surfboards. When the glass bubble ingredient is present in limited quantities, the compositions limit their ability to opacify due to scattering of incident light.

With further attention being directed to the glass bubbles employed in the coating, these particles by nature of their spherical configuration and microscopic size provide flowability along with the surface roughness and/or coarseness, and further facilitate utilization of the coatings by spray and/or aerosol application techniques. Since the density of the microspheres is in the range of 0.23 grams per cc, the individual spheres tend to float to the surface of the wet coating so as to form a micro-roughness which in combination with the elastomeric nature of the binder system is believed to contribute to the improvement in the anti-slip and frictional characteristics. Furthermore, the high isostatic compressive strength of about 500 pounds per square inch also contributes to the durability of the coating when subjected to repeated use. The 70 micron average size of the spheres contributes, as indicated, to the utility of sprayable coatings with minimal clogging of the spray nozzles typically utilized.

The examples set forth as Examples 1 and 2 illustrate coating formulations which, when applied to surfboards and wind surfing equipment, are difficult to remove by peeling of the dried coating. The cohesive strength of the coatings is reduced by the inclusion and/or addition of methylmethacrylate copolymers, however this component has been found to increase the adhesive strength. Thus, the dried coating produced by the formulation shown in Example 3 has a relatively high cohesive strength but a relatively lower peel strength. If desired, the formulation of Example 3 may be utilized in combination with a primer treatment so as to increase the adhesive strength of the formulation of Example 3, as well as those shown in Examples 1 and 2.

The various aspects of the present invention as set forth hereinabove are further defined in the claims hereinbelow, it being noted that those skilled in the art may depart from the specific formulations set forth in the examples hereinabove without departing from the spirit and scope of the present invention.

We claim:

1. Surface coating formulation for application to surfaces in contact with water for providing surface roughness and for increasing frictional and anti-slip characteristics of such surfaces while wet, said formulation comprising:

(a) a styrene/ethylene/butylene/styrene block copolymer and contained in said formulation in an amount ranging from between about 30 and 60 parts by weight;

(b) finely divided silicon dioxide filler selected from the group consisting of particulate colloidal and powdered silicon dioxide and contained in said formulation in an amount ranging from between about 3 and 10 parts by weight;

(c) solvent solution of methylmethacrylate copolymer solids and contained in said formulation in an amount ranging from between about 15 parts and 25 parts by weight;

(d) rubber tackifier solids and contained in said formulation in an amount ranging from between about 5 parts and 15 parts by weight; and (e) glass microspheres substantially uniformly distributed in said formulation and having an average size of up to about 70 microns, and contained in said formulation in an amount ranging from between about 5 parts and 15 parts by weight.

2. The formulation as set forth in claim 1 wherein said particulate solid filler is selected from the group consisting of particulate solid silicon dioxide and glass microspheres having an average size of less than 70 microns.

3. Surface coating formulation for application to surfaces of plastic foam structures for increasing frictional and anti-slip characteristics of such surfaces, said formulation comprising:

(a) as styrene/ethylene/butylene/styrene block copolymer and contained in said formulation in an amount ranging from between about 30 and 60 parts by weight;

(b) finely divided silicon dioxide filler selected from the group consisting of particulate colloidal and powdered silicon dioxide and contained in said formulation in an amount ranging from between about 3 and 10 parts by weight;

(c) solvent solution of methylmethacrylate copolymer solids and contained in said formulation in an amount ranging from between about 15 and 25 parts by weight;

(d) rubber tackifier solids and contained in said formulation in an amount ranging from between about 5 and 15 parts by weight; and (e) glass microspheres substantially uniformly distributed in said formulation and having an average size of up to about 70 microns, and contained in said formulation in an amount ranging from between about 5 and 15 parts by weight.

* * * * *